United States Patent
Bodnar et al.

[15] 3,644,126
[45] Feb. 22, 1972

[54] METHOD OF MAKING A STARCH CONVERSION SYRUP

[72] Inventors: Dean A. Bodnar, Charles W. Hinman, both of Clinton, William J. Nelson, Camanche, all of Iowa

[73] Assignee: Standard Brands Incorporated, New York, N.Y.

[22] Filed: May 26, 1969

[21] Appl. No.: 827,982

[52] U.S. Cl. ................................99/142, 99/142, 127/30
[51] Int. Cl. ..........................................C12b 1/00
[58] Field of Search ..............99/142; 195/31, 31 P, 2, 7; 127/30

[56] References Cited

UNITED STATES PATENTS

| | | | |
|---|---|---|---|
| 2,891,869 | 6/1959 | Langlois | 99/142 |
| 3,137,639 | 6/1964 | Hurst et al. | 195/31 |
| 3,329,578 | 7/1967 | Faucett et al. | 195/31 |

OTHER PUBLICATIONS

Suzuki, Die Starke, Vol. 9 Sept. 1964 pages 285–293.
Chemicals Used in Food Processing, National Academy of Sciences— National Research Council— Publication 1274, 1965.

Primary Examiner—A. Louis Monacell
Assistant Examiner—Roger B. Andewelt
Attorney—Aaron B. Karas

[57] ABSTRACT

The disclosure is directed to a method of making a starch conversion syrup which includes treating an aqueous slurry of starch with a starch-liquefying enzyme under conditions to obtain therein a D.E. of less than about 35. This liquefied starch slurry is then digested with glucoamylase and malt enzymes to obtain a conversion syrup having less than 45 percent dextrose and sufficient maltose to provide at least 85 percent total fermentable sugars.

10 Claims, No Drawings

METHOD OF MAKING A STARCH CONVERSION SYRUP

THE INVENTION

This invention relates to a method of making a highly fermentable dextrose-conversion syrup having the property of being noncrystallizing on storage. More particularly, the present invention relates to an enzymatic method of making a highly fermentable dextrose-conversion syrup having the property of being noncrystallizing on storage.

Highly fermentable dextrose-containing syrups have particular utility in the brewing and baking industries. These industries are desirous of obtaining dextrose-containing syrups having a high fermenting capacity. However, the amounts of dextrose which may be present in such syrups are limited by its solubility. If dextrose crystallizes out of solution while it is being handled or stored, it will cause obvious problems such as stoppages in the pipes or conduits in which it is transported. Thus, it has been the practice in the art to manufacture a syrup for these industries which contains dextrose at a concentration just below the point at which dextrose crystallization occurs. In order to increase the fermentability of these syrups, maltose generally has been provided in the syrups.

There are a number of patents in the area of providing highly fermentable dextrose-containing syrups. Exemplary of two patents which describe processes for producing such syrups are U.S. Pat. Nos. 2,891,869 to Langlois and 3,137,364 to Hurst et al. In both of these patents the processes described include first thinning or liquefying starch with an acid and then digesting the acid thinned starch with malt enzymes, e.g., beta-amylase, and glucoamylase. The function of the malt enzymes is to convert a portion of the starch to maltose whereas the function of the glucoamylase is to convert substantially all the remaining portion of the starch to dextrose.

Although carrying out these processes results in syrups with the prescribed amount of dextrose, the total concentration of fermentable sugars present, e.g., dextrose, and maltose, is generally not as high as desired. Fermentable sugars, as known in the art, are sugars which can be fermented by yeast.

It is the principal object of the present invention to provide a process for producing a dextrose-containing syrup containing up to about 45 percent dextrose and sufficient maltose to provide at least about 85 percent total fermentable sugars.

This object, and other objects of the present invention which will be apparent from the following description, may be attained by treating an aqueous slurry of starch with a starch-liquefying enzyme under conditions to obtain therein a D.E. of less than about 35 and digesting the liquefied starch slurry with glucoamylase and malt enzymes to obtain a syrup having less than about 45 percent dextrose and sufficient maltose to provide at least about 85 percent total fermentable sugars.

The first step in the present process includes treating an aqueous slurry of starch with a starch-liquefying enzyme. It is preferred that the starch slurry have a concentration of from about 10 to about 25 B. and most preferably a B. of about 18. The pH of the slurry should be adjusted to a level of from about 5.5 to about 7 and preferably to a level of from about 6 to about 6.5. This pH adjustment may be accomplished by the addition of any suitable alkali, for example, hydrated lime. A starch-liquefying enzyme is then incorporated into the slurry and the slurry subjected to starch-liquefying conditions. The preferred starch-liquefying enzyme is alpha-amylase derived from *B. subtilis*. Sufficient alpha-amylase should be incorporated into the slurry to provide from about 10,000 to about 30,000 liquefons per pound of dry substance.

The preferred process for liquefying the starch is a two-step procedure wherein alpha-amylase is incorporated into the pH-adjusted slurry and the slurry heated as quickly as possible to a temperature of from about 170° to about 190° F. preferably about 188° F. and held there for a sufficient time to paste and thin the starch. This step may be carried out in a number of ways but typically it will entail heating the slurry by means of a steam jet through which steam is introduced. The starch slurry may be maintained at this temperature for a sufficient time, e.g., one-half hour, to paste and thin the starch. This slurry is then passed through a steam jet autoclave wherein it is heated to a temperature in the range of from about 250° to about 320° F. to disintegrate any heat-resistant starch granules which may be present. Any conventional steam jet autoclave may be used. Exemplary of steam jets which may be used are those manufactured by Schutte and Foerting Co., Bucks County, Pa., under the trade name of Steam Jet Exhauster; those manufactured by Hydro-Thermal Corp., Milwaukee, Wis., under the trade name of Hydroheater; and the type disclosed in U.S. Pat. No. 3,133,836 to V. L. Winfrey et al. The holding time of the starch slurry may be from 10 to 20 seconds. After the slurry is autoclaved it is cooled to a temperature of from about 170° to 190° F. and preferably about 188° F. and alpha-amylase incorporated therein. Typically, sufficient alpha-amylase will be added to provide from about 1,000 to about 10,000 liquefons per pound of dry substance and preferably about 5,000 liquefons will be added. The starch slurry will be maintained under these conditions until liquefaction of the starch is substantially completed. This may take about 2 hours. The liquefied starch after this step should be a D.E. of not over 35 and preferably a D.E. in the range of from about 10 to 20. The dry substance of the slurry at this point in the process is not critical but typically it will be in the range of 30 to 35 percent.

The temperature of the liquefied starch slurry is reduced to between about 122° and about 140° F. and preferably to about 131° F. prior to the slurry being digested with malt enzymes and glucoamylase. If required, the pH of the starch slurry is adjusted to a range of from about 5 to about 6.5 and preferably to a range of from about 5.5 to about 6. Ground barley malt (a source of beta-amylase) and glucoamylase are added to the slurry. Typically, the ground barley malt will be added at a level of from about 0.5 to about 2 percent based on the substrate solids and preferably it will be added at a level of 1 percent on the same weight basis. Typically, sufficient glucoamylase is added to attain a level of from about 0.5 to about 10 glucoamylase units per 100 grams of dry substance and preferably about 3 glucoamylase units on the same basis. The concentration of the glucoamylase employed is to some extent dependent upon the amount of malt used and upon the ratio of dextrose to fermentables desired in the syrup. Malt enzymes and glucoamylase may be added simultaneously or sequentially with the malt enzymes being added first.

Conditions are maintained until the dextrose concentration reaches a level from about 33 to about 45 percent and the total fermentables reach a level of above about 85 percent. The saccharification action of the enzymes may be terminated by adjusting the pH of the conversion syrup downward and/or heating the syrup to high temperatures, e.g., above 165° F. Other means of terminating saccharification may be used, for instance, passing the syrup through an adsorbent which removes the enzymes or by introducing into the syrup chemical agents which will inactivate the enzymes.

After the starch is liquefied and prior to its being digested with malt enzymes and glucoamylase, it is preferred that a microbial inhibitor be added. A suitable microbial inhibitor is sodium bisulfite. The microbial inhibitor will prevent the growth of acid-producing micro-organisms which may be present and thus prevent the pH of the starch slurry from drifting downward during saccharification to a level where inactivation of malt enzymes may occur. pH maintenance with an alkali during saccharification is essentially impractical because of the large amounts of alkali that are required. These large amounts of alkali will increase the ash content of the syrup to an undesirable level.

In order to more clearly describe the nature of the present invention, specific examples will hereinafter be described. It should be understood, however, that this is done solely by way of example, and is intended to neither delineate the scope of the invention nor limit the ambit of the appended claims. In the examples and throughout the specification, percentages refer to percent by weight and are based upon the dry substance of the conversion syrup unless otherwise specified.

The analytical procedures and testing methods referred to in this specification were performed by the following procedures:

Determination of Alpha-Amylase Activity the term liquefon is defined as the amount of enzyme which will dextrinize 0.351 mg. of starch per minute at 30° C. and a pH of 6.2 in a 30-milliliter test solution containing 400 mg. of starch and is calculated using the following formula:

$$\text{Liquefons/g} = \frac{1140}{\text{Weight (g) of Enzyme} \times \text{Time (min)}}$$

The method used is a modification of that adapted by the American Association of Textile Chemists (AATC) published in the American Dyestuff Reporter, July 9, 1962. The modifications of the published method are as follows:

1. The buffer for the substrate was prepared by dissolving 25.3 g. of C. P. sodium hydroxide and 340 g. of potassium dihydrogen phosphate in water and diluting to 2 liters. The pH of the buffer was 6.2,
2. 125 ml. of the buffer was added to the substrate before the substrate was brought to the necessary volume,
3. and 20 ml. of the substrate and 10 ml. of the enzyme solution were used per determination.

Determination of Glucoamylase Activity

A glucoamylase unit is the quantity of enzyme activity which will produce 1 gram of reducing sugar calculated as dextrose in one hour at 60° C. on a starch paste substrate containing 4 percent dry substance.

Exactly 25 g. of soluble starch (Merck Lintner Starch—Special for Diastatic Power Determination) was heated, with stirring, in 700 ml. of distilled water until boiling and then held at this temperature 5 minutes. The starch preparation was cooled to ambient temperature with constant stirring, the pH adjusted to 4.3±0.1 with 20 ml. of a 1.0 molar solution of sodium acetate, (pH adjusted to 4.3 with acetic acid) and diluted to 1,000 ml. with distilled water. Then 100 ml. of this starch substrate was pipetted into a 250 ml. Erlenmeyer flask, stoppered and attempered at 60° C. for 15 minutes in a constant-temperature water bath. The enzyme preparation was diluted by transferring 50 ml. of the preparation to a 2,000 ml. volumetric flask and making up to volume. A 3 ml. aliquot of the diluted enzyme solution was added to the starch substrate, mixed thoroughly, stoppered, and held in a water bath maintained at 60° C. for exactly 1 hour. At the end of 1 hour, 5 ml. of a 5 percent sodium hydroxide solution was added to the flask to terminate the enzyme action. The enzymatically converted hydrolysate was cooled to about 30° C. Ten ml. of the hydrolysate was pipetted into a Fehling's titration flask containing 25 ml. of boiling Fehling's solution. The titration with standard dextrose solution was completed using methylene blue as an indicator. A blank determination using 3 ml. of distilled water in place of the enzyme preparation was performed in the manner described above. The activity was calculated as follows:

Glucoamylase Units/g.=(B−D)(S)(T)(E)/(F)(G)(H)(W)

where: B=ml. of standard dextrose solution required for the control.

D=ml. of standard dextrose solution required for the enzymatically converted hydrolysate.

S=g. of dextrose per ml. of standard dextrose solution (0.005).

T=final volume of enzymatically converted hydrolysate (108 ml.).

E=volume, ml. of diluted enzyme solution (2,000—except with enzyme preparation of 0 to 3 potency in which the final dilution is 1,000 ml.).

F=volume, ml. of enzymatically converted hydrolysate titrated with Fehling's solution (10).

G=reaction time in hours (1).

H=volume, ml. of diluted enzyme solution added to the substrate-buffer solution (3).

W=weight in g. of enzyme preparation used.

Determination of the Composition of the Syrups

The composition of the syrups described herein was determined according to the chromatographic procedures described in Method E-62 of the Standard Analytical Methods of the Member Companies of the Corn Industries Research Foundation.

Determination of Dextrose Equivalent

The abbreviation, D.E., contained herein refers to "dextrose equivalent" and is defined as the reducing sugars expressed as dextrose and calculated as a percentage of the dry substance.

The analysis was performed according to Method E-26 in the Standard Analytical Methods of the Member Companies of the Corn Industries Research Foundation.

EXAMPLE I

This example illustrates the procedure for producing a highly fermentable conversion syrup in accordance with the method of the present invention.

A 22° B. slurry of corn starch in water was diluted to 18° B. and adjusted to a pH of 6.8–7.0 by the addition of hydrated lime. Fifteen thousand liquefons of alpha-amylase (produced from a *B. subtilis* fermentation) was then added. The mixture was heated to 188° F. and held for one-half hour after which time it was autoclaved at 300° F. for 10 seconds. The autoclaved mixture was cooled to 188° F. and additional 5,000 liquefons of alpha-amylase added and the mixture held at 188° F. for 2 hours. At this point the D. E. of the mixture was 16.2, the pH was 6.3 and it contained 30.5 percent solids.

The temperature of the above partial hydrolysate was then reduced to 131° F. and sodium bisulfite equivalent to 0.05 percent of the solids was added to inhibit growth of acid-producing micro-organisms. Ground barley malt equivalent to 1 percent of the substrate solids was added and saccharification allowed to continue for 24 hours. Three units of glucoamylase derived from *A. niger* per 100 grams of substrate solids were then added and, periodically, samples of the conversion syrup were withdrawn and the enzymes therein inactivated by heat treatment (heated to at least 190° F. for at least 15 minutes). The samples were then analyzed for monosaccharides (dextrose) and disaccharides (maltose) content by paper chromatography. The temperature of the digest was maintained at about 131° F. throughout the saccharification and no pH adjustments were made. The results of the analysis are shown below in Table I.

TABLE I

Hydrolysis of 16.2 D.E. enzyme liquefied starch using barley malt and glucoamylase

| Sample | D.E. | percent Dextrose | Percent Maltose | Percent total Fermentables (Dextrose+Maltose) |
|---|---|---|---|---|
| 1 | 45.8 | 4.3 | 55.5 | 59.8 |
| 2 | 48.4 | 6.1 | 57.1 | 63.2 |
| 3 | 53.8 | 13.1 | 58.7 | 71.8 |
| 4 | 58.9 | 19.6 | 59.0 | 78.6 |
| 5 | 66.1 | 33.5 | 51.6 | 85.1 |
| 6 | 68.0 | 37.4 | 48.9 | 86.3 |
| 7 | 70.2 | 42.5 | 44.9 | 87.4 |

EXAMPLE II

This example illustrates the preparation of a starch conversion syrup employing an acid-liquefied substrate.

To a 20° B. slurry of corn starch, 0.082 percent HCl based on the weight of the starch dry substance was added and the slurry autoclaved at 30 p.s.i.g. for 4 minutes. The resulting partial hydrolysate had a D.E. of 15.

Soda ash was added to the hydrolysate to achieve therein a pH of 5.5 and the temperature adjusted to about 131° F. To this substrate was added 0.05 percent sodium bisulfite to control bacterial contamination. Saccharification of the substrate was then carried out employing ground barley malt and glucoamylase derived from *A. Niger* in the manner described in Example I. Periodically, samples of the conversion syrup were withdrawn and the enzymes therein inactivated by heat treatment (heated to at least 190° F. for at least 15 minutes). The samples were analyzed for monosaccharides (dextrose) and dissaccharides (maltose) content by paper chromatography. The results of the analysis are shown in Table II.

TABLE II

Hydrolysis of 15.0 D.E. acid liquefied starch using barley malt and glucoamylase

| Sample | D.E. | Percent Dextrose | Percent Maltose | Percent total Fermentables (Dextrose+Maltose) |
|---|---|---|---|---|
| 1 | 55.6 | 20.1 | 55.2 | 75.3 |
| 2 | 62.6 | 30.3 | 50.2 | 80.5 |
| 3 | 66.0 | 37.1 | 45.0 | 82.1 |
| 4 | 70.1 | 47.7 | 36.8 | 84.5 |
| 5 | 77.8 | 61.2 | 25.0 | 86.2 |

Comparison of the results in Tables I and II demonstrates the advantages of the present invention. It will be observed that use of the enzyme liquefaction procedure as employed in this invention results in products having higher maltose/dextrose ratios than are obtainable with the procedures of the prior art. Thus, the invention provides a means for producing syrups of exceptionally high total fermentability with reduced danger of dextrose crystallization occurring in the finished syrup.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A process for producing a highly fermentable starch conversion syrup which comprises incorporating a starch-liquefying enzyme into an aqueous slurry of starch having a pH of from about 5.5 to about 7, maintaining the starch slurry under starch-liquefying conditions, heating the starch slurry to a temperature of from about 250° to about 320° F., cooling the starch slurry, incorporating a starch liquefying-enzyme into the starch slurry, maintaining the starch slurry under starch-liquefying conditions thereby obtaining a liquefied starch slurry having a D.E. of less than 35 and digesting the liquefied starch slurry with glucoamylase and malt enzymes to obtain a starch conversion syrup having less than about 45 percent dextrose and sufficient maltose to provide at least about 85 percent total fermentable sugars.

2. A process for producing a highly fermentable starch conversion syrup as defined in claim 1, wherein the liquefied starch prior to being digested with glucoamylase and malt enzymes has a D.E. of from about 10 to about 20.

3. A process for producing a highly fermentable starch conversion syrup as defined in claim 1, wherein prior to the liquefied starch slurry being digested with glucoamylase and malt enzymes there is added a sufficient amount of a microbial inhibitor to prevent growth of acid-producing micro-organisms therein.

4. A process for producing a highly fermentable starch conversion syrup as defined in claim 3, wherein the microbial inhibitor is sodium bisulfite.

5. A process for producing a highly fermentable starch conversion syrup as defined in claim 3, wherein the starch slurry prior to being subjected to starch liquefying conditions has a B. of from about 10 to about 25.

6. A process for producing a highly fermentable starch conversion syrup as defined in claim 3, wherein the starch is liquefied at a temperature of from about 170° to about 190° F.

7. A process for producing a highly fermentable starch conversion syrup as defined in claim 6, wherein the temperature of the liquefied starch slurry is maintained in the range of from 122° to about 140° F. while it is being digested with glucoamylase and malt enzymes.

8. A process for producing a highly fermentable starch conversion syrup as defined in claim 7, wherein the pH of the liquefied starch slurry is maintained in the range of from about 5 to about 6.5 while it is being digested with glucoamylase and malt enzymes.

9. A process for producing a highly fermentable starch conversion syrup as defined in claim 8, wherein the starch-liquefying enzyme used to liquefy the starch is alpha-amylase derived from *B. subtilis* and sufficient alpha-amylase is used in the first starch-liquefying treatment to provide from about 10,000 to about 30,000 liquefons per pound of dry substance present.

10. A process for producing a highly fermentable starch conversion syrup as defined in claim 9, wherein sufficient alpha-amylase is used in the second starch-liquefying treatment to provide from about 1,000 to about 10,000 liquefons per pound of dry substance present.

* * * * *